United States Patent Office 3,553,281
Patented Jan. 5, 1971

3,553,281
ISOMERIZATION PROCESS AND
CATALYST THEREFOR
Anthony George Goble and John Norman Haresnape,
Sunbury-on-Thames, England, assignors to The British
Petroleum Company Limited, London, England, a joint-
stock corporation of Great Britain
No Drawing. Filed Sept. 1, 1961, Ser. No. 135,426
Claims priority, application Great Britain, Sept. 7, 1960,
30,821/60; Oct. 21, 1960, 36,154/60
Int. Cl. C07c 5/24
U.S. Cl. 260—683.68                    14 Claims

ABSTRACT OF THE DISCLOSURE

A catalyst suitable for the isomerization of $C_4$ and higher paraffinic hydrocarbons is prepared by contacting alumina with a compound of the formula

under conditions such that free aluminum chloride is not formed. X and Y may be the same or different and selected from H, Cl, Br, F or SCl, or X and Y together may be O or S. The catalyst may optionally contain a metal or metal compound having hydrogenating activity selected from Group VIa or VIII of the Periodic Table—the preferred being the platinum group metals.

---

This invention relates to the preparation of catalysts suitable for the isomerisation of $C_4$ and higher paraffins boiling within the gasoline boiling range, i.e. up to 400° F. (204° C.), at temperatures below 400° F. (204° C.). The invention also includes an isomerisation process employing our novel catalyst.

According to the present invention a catalyst suitable for use in an isomerisation process as defined above is prepared by contacting alumina with a compound of general formula

(where X and Y may be the same or different and selected from H, Cl, Br, F, or SCl, or where X and Y together may be O or S) under non-reducing conditions and at a temperature such that chlorine is taken up by the alumina without the production of free aluminum chloride.

It is well known that alumina will react with a variety of chlorinated hydrocarbons, but the present compounds give a specific form of chlorination which produces active low temperature isomerisation catalysts. The following examples of compounds giving active and inactive catalysts respectively illustrate the specific nature of the compounds used.

Compounds giving active catalysts:
    Carbon tetrachloride ($CCl_4$)
    Chloroform ($CHCl_3$)
    Methylene chloride ($CH_2Cl_2$)
    Dichlorodifluoromethane ($CCl_2F_2$)
    Trichlorobromomethane ($CCl_3Br$)
    Thiocarbonyltetrachloride ($CCl_3SCl$)

Compounds giving inactive catalysts:
    Hydrogen chloride (HCl)
    Chlorine ($Cl_2$)
    Methyl chloride ($CH_3Cl$)
    Acetyl chloride ($CH_3COCl$)
    Dichloroethane ($CH_2Cl—CH_2Cl$)
    Tetrachloroethane ($CHCl_2—CHCl_2$)
    Tetrachloroethylene ($CCl_2=CCl_2$)

In the case of compounds containing elements other than chlorine, carbon and hydrogen, the treatment may add the other elements to the catalyst in addition to the chlorine. For example treatment with dichlorodifluoromethane results in the uptake of both chlorine and fluorine onto the catalyst. It has been found, however, that catalysts so prepared are still active for low temperature isomerisation, and they may have, in addition, other properties resulting from the addition of the other elements. It has also been found that small amounts of halogens (including chlorine) which may be present in the alumina prior to the chlorination treatment of the present invention do not affect the activity of the catalysts for low temperature isomerisation although this halogen does not contribute in any way to the isomerisation activity. Thus, the alumina used may already contain up to 1% wt. of chlorine and/or fluorine, as when, for example, the initial material which is chlorinated by the process of the present invention is a catalyst normally used for the reforming of gasoline boiling range hydrocarbons. The preferred compounds giving active catalysts are carbon tetrachloride, chloro form and methylene chloride.

The compounds covered by the general formula in which X and Y together are O or S are phosgene and thiophosgene.

Any convenient form of alumina may be used which contains hydrogen. This is a characteristic of activated aluminas which although predominantly alumina do contain a small amount of hydrogen, usually less than 1% wt. This hydrogen is generally considered to be in the form of surface hydroxyl groups, and it is believed that the chlorine compound reacts with the surface hydroxyl groups to form the active catalyst sites. Water is, in fact, a product of the reaction, but not all the hydrogen is removed and the treated catalyst still contains a measurable quantity of hydrogen. The amount of chlorine added to the catalyst is preferably within the range 1 to 15% wt., the precise amount being dependent on the surface area as measured by low temperature nitrogen adsorption. It has been found that the maximum amount of chlorine which can be added without the formation of free aluminum chloride is related to the surface area and is about $3.0$–$3.5 \times 10^{-4}$ g./$m.^2$. Maximum chlorination is preferred, but lower amounts of chlorine still give active catalysts and a suitable range is, therefore, from $2.0 \times 10^{-4}$ to $3.5 \times 10^{-4}$ g./$m.^2$.

Any of the forms of alumina suitable as a base for reforming catalysts may be used, but a particularly preferred form is one derived from an alumina hydrate precursor in which the trihydrate predominates. One containing a major proportion of $\beta$-alumina trihydrate is particularly suitable. A convenient method of preparing the alumina is by hydrolysis of an aluminium alcoholate, for example aluminium isopropoxide, in an inert hydrocarbon solvent, for example, benzene. Other things being equal, the greater the amount of chlorine taken up by the alumina, the greater is the activity of the catalyst and since, as stated above, the maximum amount of chlorine which can be added is related to the surface area, it is desirable that the alumina should have a high surface area, for example more than 250 $m.^2$/g. and preferably more than 300 $m.^2$/g.

If desired there may be admixed with the alumina a minor proportion of one or more other refractory oxides selected from Groups II to V of the Periodic Table. Thus the alumina may contain up to 50% wt. of, for example, silica, titania, beryllia, zirconia or magnesia.

Preferably the alumina contains a minor proportion of a metal or metal compound having hydrogenating activity selected from Group VIa or VIII of the Periodic Table. The preferred metal is a platinum group metal which may be present in an amount from 0.01 to 5% wt. and preferably 0.1 to 2% wt. The preferred platinum group metals are platinum and palladium, which have been found to be equivalent in effectiveness in low temperature isomerisation catalysts.

The hydrogenating metal is desirably incorporated with the alumina prior to the treatment with the chlorine. When using a platinum group metal it is also desirable that it should be finely dispersed as small crystallites on the alumina, suitable criteria for the size of the crystallites being that they are not detectable by X-ray diffraction or that on treatment of the platinum group metal-alumina composite with benzene at 250° C. they have a measurable benzene chemisorption, preferably not less than 0.1 molecule of benzene absorbed/atom of platinum and not less than 0.03 molecule of benzene absorbed/atom of palladium. Details of the benzene chemisorption technique have been published in "Actes du Deuxieme Congres Internatoinal de Catalyse," Paris (1960), vol. 2, page 1851.

A convenient method of obtaining the platinium group metal in the required state of sub-division is to add a solution of a platinum group metal compound to a hydrogel of the alumina and to precipitate the platinum group metal as a sulphide, for example, by treatment with hydrogen sulphide. The treatment of the platinum group metal-alumina composite with the chlorine compound is preferably given with the platinum group metal in a reduced state, and this can conveniently be achieved by pretreating the composite with hydrogen. When a platinum group metal-alumina composite is treated with a chlorine compound according to the present invention it is believed that a portion of the chlorine taken up is associated with the platinum group metal as an active complex.

In some cases, the presence of active complexes in the catalysts can be demonstrated by the development of intense colours (orange-yellow) on treatment with dry benzene.

An alumina only (after carbon tetrachloride treatment) gives a yellow colour with benzene but this does not persist on flushing with dry nitrogen.

The platinum-on-alumina (after treatment with carbon tetrachloride) however gives a stable yellow colour with benzene and can be stored under dry nitrogen idefinitely.

The non-reducing conditions used for the chlorination may be either inert or oxidising conditions, the latter being preferred since they give catalysts which lose activity more slowly during low temperature isomerisation. A convenient method of contacting the alumina is to pass a gaseous stream of the chlorine compound over the alumina either alone or, preferably, in a non-reducing carrier gas. Examples of suitable carrier gases are nitrogen, air or oxygen.

Non-reducing conditions are essential, since reducing conditions tend to convert the chlorine compound to hydrogen chloride, which gives an inactive catalyst. The temperature for the chlorination may be from 300–1100° F. (149–593° C.). The tendency to form free aluminium chloride increases with temperature and care should, therefore, be exercised when using the higher temperatures within the stated range. Since the temperatures used will normally be above the volatilisation temperature of aluminium chloride the formation of free aluminium chloride is readily detected by its appearance in the gaseous reaction products. When treating a platinum group metal-alumina composite, care should also be exercised to prevent the formation of volatile platinum complexes, the tendency for the formation of such complexes again increasing with increasing temperature. When treating platinum group metal-alumina composites the temperature is preferably 300–700° F.) 149–371° C.), platinum-on-alumina composites being more particularly treated at 450–600° F. (232–316° C.) and palladium-on-alumina composites at 500–650° F. (260–343° C.). The chlorination reaction is exothermic and the temperatures specified are the initial temperatures used.

The rate of addition of the chlorine compound is preferably as low as practicable to ensure uniform chlorination and to avoid a rapid increase of temperature as a result of the exothermic reaction. Preferably the addition rate does not exceed 1.3% wt. of chlorine compound by weight of catalyst per minute. If a carrier gas is used, the rate of flow is preferably at least 200 volumes/volume of catalyst/hour and a convenient range is 200–1000 v./v./hr. The pressure used is conveniently atmospheric.

The active catalyst is susceptible to hydrolysis in the presence of water and should, therefore, be stored under anhydrous conditions. Similarly the materials used in the catalyst preparation should also be free from water.

As indicated hereinbefore, the invention also includes the utilization of our catalyst in the isomerization of $C_4$ or higher paraffin hydrocarbons boiling in the gasoline range, i.e. up to 400° F. (204° C.), at temperatures of up to 400° F. (204° C.), and more particularly to the isomerization of pentanes and/or hexanes. The term isomerization includes both the conversion of normal paraffins to iso-paraffins and the conversion of iso-paraffins with a higher degree of branching.

The isomerization of normal paraffins is assuming greater importance in the development of high octane motor fuels. Hitherto the desired increase in octane number has been obtained largely by means of catalytic reforming processes which increase the aromatic content of the gasoline. However, increase in the compression ratio of modern engines makes it desirable to find other means of increasing the octane number of the fuel. It is known that the naphtha feedstock to the catalytic reforming process contains appreciable quantities of lower boiling normal paraffins and it is apparent that a considerable increase in octane number would be obtained by converting those normal paraffins into iso-paraffins.

In our process for the isomerization of $C_4$ and higher paraffin hydrocarobns, the feedstock is contacted with our hereinbefore described chlorine-containing catalyst in the presence of hydrogen at a temperature below 204° C.

The feedstock of our isomerization process is preferably one containing a major proportion of pentanes, hexanes or a mixture of these paraffins. A feedstock containing a major proportion of hexane is particularly preferred. If it is desired to isomerize normal paraffins only, the feedstock may first be treated to separate normal paraffins from the other hydrocarbons and the normal paraffins contacted with the isomerization catalyst. Such separation may conveniently be effected by means of the so-called molecular sieves.

The product of the isomerization reaction may similarly be treated to recover unconverted normal paraffins which may be recycled to the isomerization reaction zone. Such separation may also conveniently be effected by means of the so-called molecular sieves.

The isomerization may be carried out under the following conditions, in either liquid or vapor phase.

Temperature—50–400° F., preferably 150–350
Pressure—Atmospheric, 2,000 p.s.i.g., preferably 225–1000
Space velocity—0.05–10 v./v./hr., preferably 0.2–5
Hydrogen: hydrocarbon mole ratio—0.01–20:1 preferably 1.5–15:1

The feedstock is advantageously free of sulfur, water and aromatic hydrocarbons. It also has, desirably, a low content of nephthenic hydrocarbons. Suitable methods of pretreating feedstocks for an isomerization process using a catalyst of an aluminum halide and a hydrogenating metal supported on a refractory oxide are described and claimed in U.S. patent applications Ser. No. 51,302, filed Aug. 23, 1960 and Ser. No. 80,519, filed Jan. 4, 1961. The methods described therein may also be used with the isomerization process of the present invention.

The preparation of our catalyst and the use thereof in our low temperature isomerization process are illustrated by the following examples.

EXAMPLE 1

65 g. of a commercial reforming catalyst consisting of 0.58 percent weight platinum and 0.81 percent weight chlorine supported on alumina was contacted with 20 g. of dry carbon tetrachloride at 300° C. The carbon tetrachloride was added drop-wise over a period of ½ hour, while the catalyst was being flushed with dry nitrogen flowing at 250 ml./min. After reaction the flushing was continued for a further 2 hours.

The resulting composite contained 12.8 percent weight chlorine and 0.49 percent weight platinum.

The catalyst was stored in a tightly stoppered dry container and charged to an isomerisation reactor under a blanket of nitrogen.

The following operating conditions were used.

Catalyst bed temperature—270° F. (132° C.)
Plant pressure—250 p.s.i.g.
$H_2$:hydrocarbon mole ratio—2.5:1
Space velocity—0.5 v./v./hr.
Catalyst charge—70 ml.

The feedstock was a $C_6$ cut from light gasoline which had been hydrogenated and cycled over silica gel before isomerisation.

Impurity levels:
  Benzene—Undetectable by G.L.C.
  Sulphur—0.00003 percent weight
  Water—5 p.p.m.
  Bromine No.—0.02

The product, which was analysed by gas chromatography, had the composition shown in Table 1 below.

TABLE 1

| Product, wt. percent | Feed | Hours on stream | | | | |
|---|---|---|---|---|---|---|
| | | 4 | 5 | 6 | 7 | 27–31 | 51–55 |
| Propane | | (¹) | | | | (¹) | |
| iso-$C_4$ hydrocarbons | | 0.5 | 0.5 | 0.5 | 0.5 | 0.5 | (¹) |
| n-$C_4$ hydrocarbons | | (¹) | | | (¹) | (¹) | (¹) |
| iso-$C_5$ hydrocarbons | (¹) | 2.5 | 2.5 | 2 | 2 | 2 | 1.5 |
| n-$C_5$ hydrocarbons | 2.5 | 1 | 0.5 | 1 | 1 | 1 | 0.5 |
| 2,2-dimethylbutane | 1 | 28 | 29.5 | 28 | 27 | 28 | 27.5 |
| 2,3-dimethylbutane | | | | | | | |
| Cyclopentane | 35.5 | 35.5 | 33 | 35 | 33.5 | 35 | 32 |
| 2-methylpentane | | | | | | | |
| 3-methylpentane | 20 | 16 | 16.5 | 16 | 17 | 16 | 18 |
| n-$C_6$ hydrocarbons | 33.5 | 10.5 | 10.5 | 10 | 11 | 10 | 11.5 |
| Methylocyclopentane | 6 | 3 | 3.5 | 3.5 | 4 | 3.5 | 3.5 |
| Cyclohexane | 1.5 | 3 | 3.5 | 3.5 | 4 | 4 | 5.5 |

¹ Trace.

EXAMPLE 2

5.0 g. of a commercial reforming catalyst consisting of 0.58 percent weight platinum and 0.81 percent weight chlorine supported on alumina was contacted at 350° C. for 15 minutes with a stream of dry nitrogen saturated with carbon tetrachloride flowing at 250 ml./min. The nitrogen flushing was then continued for a further 1 hour.

Analysis of the resulting composite gave chlorine 12.8 percent weight, acidity (expressed as a chlorine content) 9.9 percent weight, hydrogen 0.097 percent weight and carbon 0.017 percent weight. There was no significant change in the platinum content.

The catalyst was stored in a tightly stoppered by dry container and charged to an isomerisation reactor under a blanket of nitrogen.

A dry n-hexane feed (99.9 mole percent) was passed together with hydrogen through a reactor, containing 1 ml. of catalyst, and operated under the following conditions.

Temperature—Ambient 20°–22° C.
Pressure—Atmospheric
Hydrogen/n-hexane mole ratio—6:1
Gas space velocity—240 v./v./hr.

The product, which was analysed by gas chromatography, had the composition shown in Table 2 below.

TABLE 2

| Product, wt. percent | Hours on stream | | | | | |
|---|---|---|---|---|---|---|
| | 2 | 3 | 4 | 5 | 6 | 7 |
| iso-$C_4$ hydrocarbons | 2.6 | 1.6 | 1.6 | 2.3 | 1.3 | 1.9 |
| iso-$C_5$ hydrocarbons | 3.7 | 2.1 | 2.2 | 3.1 | 2.2 | 20. |
| 2,2-dimethylbutane | 0.4 | 0.4 | 0.5 | 0.8 | 0.5 | .67 |
| 2,3-dimethylbutane | | | | | | |
| 2-methylpentane | 13.7 | 14.2 | 14.9 | 15.6 | 13.0 | 13.5 |
| 3-methylpentane | | | | | | |
| $C_6$ hydrocarbons | 79.6 | 81.7 | 80.8 | 78.2 | 83.0 | 81.3 |

EXAMPLE 3

5.0 g. of a commercial reforming catalyst consisting of 0.58 percent weight platinum and 0.81 percent weight chlorine supported on alumina was contacted at 200° C. for one hour with a stream of dry nitrogen saturated with carbon tetrachloride flowing at 100 ml./min. The nitrogen flushing was then continued for a further 2 hours.

Analysis of the resulting composite gave platinum 0.54 percent weight, chlorine 10.6 percent weight, acidity (expressed as chlorine content) 7.3 percent weight, hydrogen 0.19 percent weight and carbon 0.024 percent weight.

The activity of the composite was examined using the reactor conditions described in Example 2, but with the reaction temperature at 88°–90° C. A typical sample analysis of the product after 3 hours on stream gave 56 percent weight of $C_6$ isomers present, of which 6.5 percent weight was 2:2-dimethylbutane.

EXAMPLE 4

5.0 g. of a commercial reforming catalyst consisting of 0.58 percent weight platinum and 0.81 percent weight chlorine supported on alumina was contacted with 3 ml. of dry carbon tetrachloride at 250° C. The carbon tetrachloride was added drop-wise over a period of about 15 minutes; all this time the catalyst was being flushed with dry nitrogen flowing at 500 ml./min. After reduction the flushing continued for a further 1 hour and then 5 ml. of dry benzene was added drop-wise onto the cooled catalyst. The catalyst developed a deep orange-red colour which slowly changed to orange-yellow as the excess benzene was removed by the nitrogen flushing. The nitrogen flushing was continued for 12 hours and then the composite was transferred to a dry container and stored under dry nitrogen.

Under these storage conditions the yellow catalyst was found to be stable for a period exceeding 3 weeks.

Analysis of this benzene treated composite gave platinum 0.54 percent weight, 9.8 percent weight chlorine, acidity (expressed as chlorine content) 8.2 percent weight, hydrogen 0.20 percent weight and carbon 0.59 percent weight.

After two weeks storage the activity of the composite was examined using the atmospheric reactor conditions described in Example 2. Typical sample analyses of the product over the first 17 hours on stream gave 12 percent weight of $C_6$ isomers present. Thus the fact that the composite had been treated with benzene had no adverse effect on its isomerisation activity.

EXAMPLE 5

5.0 g. of a commercial reforming catalyst consisting of 0.58 percent weight platinum and 0.81 percent weight chlorine supported on alumina was contacted at 300° C. with a stream of dry nitrogen carrying methylene chloride vapour for half an hour. The nitrogen flow rate was 250 ml./minute. After reaction the nitrogen flushing was continued for a further one hour and then the catalyst, after cooling in dry nitrogen, was stored in a tightly stoppered dry container.

Analysis of the resulting composite gave platinum 0.54 percent weight, chlorine 9.5 percent weight, acidity (expressed as a chlorine content) 6.4 percent weight, carbon 0.65 percent weight, hydrogen 0.11 percent weight.

The catalyst (1 ml.) was charged to an isomerisation reactor under a blanket of dry nitrogen and dry-n-hexane feed was passed together with hydrogen under the following conditions:

Pressure—Atmospheric
Reaction temperature—Ambient 22-24° C.
Hydrogen/n-hexane mole ratio—6:1
Gas space velocity—200 v./v./hr.
Catalyst charge—1 ml.
Feed—n-Hexane (99.9 mole percent purity)

The product, which was analysed by gas chromatography, had the composition indicated in Table 3 below.

TABLE 3

| Product, wt. percent | Hours on stream | | | | | |
|---|---|---|---|---|---|---|
| | 3 | 4 | 5 | 6 | 7 | 25 |
| $C_1$-$C_4$ hydrocarbons | 1.3 | 0.9 | 0.5 | 0.3 | (1) | |
| $C_5$-hydrocarbons | 1.7 | 0.8 | 0.4 | 0.2 | (1) | |
| 2,2-dimethylbutane | 4.1 | 4.9 | 4.3 | 3.0 | 2.2 | [2] 0.1 |
| 2,3-dimethylbutane | | | | | | |
| 2-methylpentane | 35.7 | 39.8 | 39.9 | 37.2 | 33.3 | 9.3 |
| 3-methylpentane | | | | | | |
| n-$C_6$ hydrocarbons | 57.1 | 53.6 | 54.8 | 59.2 | 64.5 | 90.6 |

[1] Trace.  [2] About.

After 25 hours on stream at ambient temperature, 22°–24°, the reaction temperature was raised to 220° C. in the course of about one hour. Product analyses at various temperatures during this period are given in Table 4 below:

TABLE 4

| Product, wt. percent | Reaction temperature, ° C. | | | | | | | |
|---|---|---|---|---|---|---|---|---|
| | 22 | 38 | 63 | 103 | 120 | 157 | 175 | 215 |
| $C_1$-$C_4$ hydrocarbons | [1] 0.1 | [1] 0.1 | 0.1 | 0.2 | 2.5 | 6.1 | 29.6 | |
| $C_5$-hydrocarbons | | | | (2) | 0.2 | 0.9 | 3.4 | |
| 2,2-dimethylbutane | [1] 0.1 | 0.3 | 0.4 | 0.5 | 1.0 | 4.7 | 9.2 | 11.8 |
| 2,3-dimethylbutane | | | | | | | | |
| 2-methylpentane | 9.3 | 11.3 | 12.5 | 13.0 | 14.7 | 19.7 | 24.5 | 28.0 |
| 3-methylpentane | | | | | | | | |
| n-$C_6$ hydrocarbons | 90.6 | 88.3 | 87.1 | 86.5 | 84.1 | 73.0 | 59.3 | 36.1 |

[1] About.  [2] Trace.

EXAMPLE 6

5.0 g. of a commercial reforming catalyst consisting of 0.58 percent weight platinum and 0.81 percent weight chlorine supported on alumina was contacted at 300° C., with a stream of dry nitrogen carrying chloroform vapour flowing at 250 ml./minute. The chloroform had been previously well washed with distilled water to remove the alcohol stabliser and then re-dried. After 10 minutes reaction volatile materials started to emerge from the catalyst bed and the chlorination treatment was discontinued; nitrogen flushing only was then maintained for a further one hour.

Analysis of the resulting composite gave platinum 0.40 percent weight, chlorine 12.6 percent weight, acidity (expressed as a chlorine content) 9.4 percent weight, carbon 0.11 percent weight, hydrogen 0.09 percent weight.

The catalyst (1 ml.) was charged to an isomerisation reactor under a blanket of dry nitrogen and a dry n-hexane feed was passed together with hydrogen under the process conditions given in Example 5, except for the gas space velocity which is given in Table 5 below together with the product composition, as analysed by gas chromatography.

TABLE 5
[Reaction temperature, ambient 20-22° C.]

| | Gas space velocity, v./v./hr. | | | | | | |
|---|---|---|---|---|---|---|---|
| | 250 | | | | | 125 | |
| Hours on stream | 1½ | 2 | 3½ | 4 | 5 | 6 | 7 |
| i-$C_4$ hydrocarbons, percent wt | 4.1 | 2.8 | 1.3 | 1.5 | 1.5 | 5.4 | 4.0 |
| i-$C_5$ hydrocarbons, percent wt | 5.5 | 3.2 | 1.9 | 2.0 | 1.8 | 5.4 | 5.1 |
| 2,2-dimethylbutane, percent wt | 0.8 | 0.2 | 0.1 | 0.1 | [1] 0.1 | 0.5 | 0.6 |
| 2,3-dimethylbutane, percent wt | | | | | | | |
| 2-methylpentane, percent wt | 12.0 | 8.9 | 7.0 | 7.3 | 7.2 | 11.5 | 11.9 |
| 3-methylpentane, percent wt | | | | | | | |
| n-$C_6$ hydrocarbons, percent wt | 77.5 | 84.9 | 89.4 | 89.1 | 89.4 | 77.1 | 78.4 |

[1] About.

EXAMPLE 7

The catalyst preparation, again using chloroform, was carried out as in Example 6 except that the reaction temperature was 220° C. and the reaction time about half an hour.

Analysis of the resulting composite gave platinum 0.57 percent weight, chlorine 9.0 percent weight, acidity (expressed as a chlorine content) 7.1 percent weight, carbon 0.17 percent weight, hydrogen 0.17 percent weight.

A 1 ml. charge of catalyst was examined for isomerisation activity using the feedstock and process conditions of Example 5, except for the gas space velocity which is given in Table 6 below, together with the product composition, as analysed by gas chromatography.

TABLE 6
[Reaction temperature, ambient 22-24° C.]

| | Gas space velocity, v./v./hr. | | | | | | | | |
|---|---|---|---|---|---|---|---|---|---|
| | 250 | | | | | | 125 | | |
| Hours on Stream | 1 | 2 | 2½ | 3¼ | 17 | 18 | 19 | 20 | 21 |
| $C_1$-$C_4$ hydrocarbons, percent wt | 1.7 | 0.9 | 0.1 | | | | 0.3 | 0.2 | 0.2 |
| i-$C_5$ hydrocarbons, percent wt | 2.1 | 1.0 | (1) | | | | | | |
| 2,2-dimethylbutane, percent wt | 3.2 | 0.5 | (1) | (1) | (1) | (1) | 0.1 | 0.1 | 0.1 |
| 2,3-dimethylbutane, percent wt | | | | | | | | | |
| 2-methylpentane, percent wt | 32.3 | 16.9 | 8.5 | 4.9 | 4.9 | 4.8 | 6.4 | 7.6 | 7.3 |
| 3-methylpentane, percent wt | | | | | | | | | |
| n-$C_6$ hydrocarbons, percent wt | 60.6 | 80.7 | 91.3 | 95.5 | 95.1 | 93.2 | 93.3 | 92.1 | 92.4 |

[1] Trace.

After 21 hours on stream at ambient temperature, 22°–24° C., the reaction temperature was raised to 110° C. in the course of about 2 hours. Product analyses at various temperatures during this period are given in Table 7 below.

TABLE 7

| Product, wt percent | Reaction temperature ° C. | | | | | | | | | |
|---|---|---|---|---|---|---|---|---|---|---|
| | 24 | 30 | 40 | 50 | 60 | 70 | 80 | 90 | 95 | 110 |
| $C_1$-$C_4$ hydrocarbons | 0.2 | 0.2 | 0.2 | 0.2 | 5.7 | 5.3 | 3.4 | 2.3 | 2.5 | 3.3 |
| i-$C_5$ hydrocarbons | | | | | 0.1 | 8.6 | 6.6 | 3.7 | 2.3 | 4.4 |
| 2,2-dimethylbutane | 0.1 | 0.1 | 0.1 | 0.2 | 0.2 | 0.4 | 1.3 | 1.3 | 1.2 | 1.2 |
| 2,3-dimethylbutane | | | | | | | | | | |
| 2-methylpentane | 7.3 | 7.5 | 8.4 | 8.8 | 9.3 | 8.6 | 12.3 | 17.4 | 19.6 | 19.9 |
| 3-methylpentane | | | | | | | | | | |
| n-$C_6$ hydrocarbons | 92.4 | 92.2 | 91.2 | 90.8 | 84.7 | 77.1 | 76.3 | 75.2 | 74.4 | 7.12 |

EXAMPLE 8

A solution of 4 kg. aluminum isopropoxide in 20 litres Analar benzene was prepared, and 8 litres of deionised water added rapidly. The mixture was stirred for 30 minutes, and the benzene layer decanted. A further 8 litres of deionised water was added, and the remaining benzene decanted after 30 minutes stirring. The slurry was vacuum filtered and then reslurried with 4 litres of deionised water. This mixture was stirred for one hour and vacuum filtered a second time, yielding 8451 g. hydrogel.

A 3300 g. portion of the hydrogel was mixed with 1500 ml. deionised water and stirred for 2 hours. A solution of 4 g. palladium chloride in 250 ml. of 0.5 N hydrochloric acid was prepared, and added slowly to the stirred slurry. The slurry was stirred for one hour and then 750 ml. of deionised water saturated with hydrogen sulphide added. The mixture was stirred for 30 minutes, and then evaporated to dryness in an air over at 100° C., yielding 456.5 g. of dried hydrate. The hydrate was ground in a pestle and mortar, giving 247.5 g. of granular material between 8 and 16 BSS mesh. The ground hydrate was calcined at 450° S. for 2 hours, giving a yield of 161.9 g. of palladium-alumina base. The quantities used were estimated to give a palladium content of 0.7 percent weight on the calcined base.

A charge of 51.6 g. (70 ml.) of the base was placed in a glass reactor and heated to 570° F. in a stream of 15 litres/hour dry nitrogen, these conditions being maintained throughout treatment. The base was purged at 570° F. for 2 hours, and then 16 g. of dried carbon tetrachloride added drop-wise over a 20 minute period. The catalyst was purged for a further 30 minutes and then discharged, given a yield of 54.0 g.

The catalyst was tested under fixed bed, downward flow conditions. The feedback used was a dried, desulphurised and dearomatised $C_6$ cut from a refinery $C_5/C_6$ light gasoline. The processing conditions employed were as follows:

Temperature—270° F.
Pressure—300 p.s.i.g.
Hydrogen: Hydrocarbon mol ratio—2.5:1
Space velocity—0.5 v./v./hr.

The following feedstock and product analyses obtained by gas chromatography are given in Table 8 below.

TABLE 8

| | Hours on stream | | |
|---|---|---|---|
| | Feed | 15 | 54–58 |
| Composition, percent wt.: | | | |
| $C_1$–$C_4$ paraffins | | 0.5 | Trace |
| $C_5$ paraffins | 3.5 | 2.0 | 3.0 |
| $C_6$ paraffins | 88.0 | 90.0 | 88.0 |
| Naphthenes | 8.5 | 7.5 | 9.0 |
| Total | 100.0 | 100.0 | 100.0 |
| $C_6$ fraction, percent wt.: | | | |
| 2,2-dimethylbutane | 1.0 | 28.0 | 29.5 |
| 2,3-dimethylbutane | | | |
| 2-methylpentane | 39.5 | 41.5 | 40.5 |
| Cyclopentane | | | |
| 3-methylpentane | | 18.5 | 18.0 |
| n-Hexane | 22.0 | 12.0 | 12.0 |
| Total | 100.0 | 100.0 | 100.0 |

EXAMPLE 9

A charge of 56.0 g. (70 ml.) of a commercial platinum-alumina composite, comprising 0.572 percent by weight platinum and 0.81 percent by weight chlorine on alumina, in the form of ⅟₁₆ inch extruded rods, was placed in a glass reactor and a dry nitrogen gas flow of 15 litres/hour was established. The catalyst bed temperature was raised to 570° F. and maintained at this temperature throughout the treatment.

The base was purged with dry nitrogen gas for 2 hours at 570° F., and then 17.8 g. of dried chloroform were added drop-wise over a period of 18 minutes. The catalyst was further purged for one hour and then discharged, giving a yield of 49 g.

The catalyst was tested under the same conditions and using the same feedstock as in Example 8, with the results shown in Table 9 below.

TABLE 9

| | Hours on stream | | |
|---|---|---|---|
| | Feed | 5–8 | 23–26 |
| Composition, percent wt.: | | | |
| $C_1$–$C_4$ paraffins | | Trace | Trace |
| $C_5$ paraffins | 3.5 | 2.0 | 3.0 |
| $C_6$ paraffins | 88.0 | 89.5 | 89.5 |
| Naphthenes | 8.5 | 8.5 | 7.5 |
| Total | 100.0 | 100.0 | 100.0 |
| $C_6$ fraction, percent wt.: | | | |
| 2,2-dimethylbutane | 1.0 | 24.0 | 24.0 |
| 2,3-dimethylbutane | | | |
| 2-methylpentane | 39.5 | 42.0 | 42.5 |
| 2-methylpentane | | | |
| 3-methylpentane | 22.0 | 19.5 | 19.5 |
| n-Hexane | 37.5 | 14.5 | 14.0 |
| Total | 100.0 | 100.0 | 100.0 |

EXAMPLE 10

80 ml. (65.0 g.) of a commercial platinum-alumina composite, comprising 0.572% wt. platinum and 0.81% chlorine on alumina was placed in a glass reactor and dry nitrogen gas flow of 40 litres/hour was passed over it for four hours. 6 ml. of trichloro-bromomethane were added in 13 minutes by dropping it into the nitrogen flow. The catalyst bed temperature was 512° F. The catalyst was purged with the nitrogen for a further 2 hours and discharged. The yield of catalyst was 69 g. and it had a chlorine content of 8.6% wt. and a bromine content of 1.35% wt.

The catalyst was tested under fixed bed, downward flow conditions. The feedstock used was a dried, desulphurised and dearomatised $C_6$ cut from a refinery $C_5/C_6$ light gasoline. The processing conditions employed were:

Temperature—270° F.
Pressure—250 p.s.i.g.
Hydrogen-hydrocarbon mole ratio—2.5:1
Space velocity—2.0 v./v./hr.

The following feedstock and product analyses obtained by gas chromatography are given in Table 10 below.

TABLE 10

| | Hours on stream | | | |
|---|---|---|---|---|
| | Feed | 3–6 | 9–12 | 18–21 |
| Unstabilised liquid recovery, percent wt. | | 88.5 | 93.0 | 98.5 |
| $C_1$–$C_5$ hydrocarbons, percent wt. | 2.5 | 3.0 | 3.5 | 3.5 |
| 2,2-dimethylbutane, percent wt. | 2 | 11.0 | 11.5 | 9.5 |
| $C_6$ naphthenes, percent wt. | 8 | 6.5 | 8.5 | 7.0 |

EXAMPLE 11

5.0 g. of a platinum-alumina catalyst, containing 0.58% wt. platinum and 0.81% wt. chlorine, were purged at 385° C. with nitrogen for 30 minutes before being reacted at 385° C. with difluoro-dichloromethane gas, flowing at 50 ml./min., for 5 minutes. The resulting composite was then purged for a further 1 hour with dry nitrogen.

On analysis, it gave 3.2% wt. fluorine, 6.5% wt. chlorine and 0.51% wt. platinum.

The catalyst was tested for isomerisation activity using the feedstock and process conditions used in Example 3. A typical sample analysis of the product after 3 hours on stream gave 50% wt. of $C_6$ isomers present of which 5% wt. was 2,2-dimethylbutane.

EXAMPLE 12

40 ml. (26.5 g.) of a commercial platinum alumina composite comprising 0.74% wt. platinum, 0.35% wt. fluorine and 0.35% wt. chlorine on alumina was dried for 2 hours at 600° F. in a flow of 40 litres/hour dry nitrogen, and reduced for 2 hours at 600° F. in a flow of 40 litres/hour of dry hydrogen. It was then treated with 14.4 ml. (23 g.) of carbon tetrachloride over 2½ hours in a flow of 40 litres/hour of dry nitrogen at a temperature of 600° F. The catalyst was purged with the nitrogen for a further two hours and then discharged. The chlorine content of the catalyst was 4.1% wt.

The catalyst was tested for isomerization activity using a feedstock similar to that of Example 10 under the following conditions.

Temperature—270° F.
Pressure—250 p.s.i.g.
Hydrogen-hydrocarbon mole ratio—2.5:1
Space velocity—1.5 v.v./hr.

The following feedstock and product analyses obtained by gas chromatography are given in Table 11 below.

TABLE 11

|  | Feed | Hours on stream | | |
|---|---|---|---|---|
|  |  | 3.6 | 12.5 | 24.27 |
| Unstabilised liquid recovery, percent wt. |  | 96.8 | 89.7 | 86.3 |
| $C_1$-$C_5$ hydrocarbons, percent wt. | 2.5 | 6 | 4.5 | 5 |
| 2,2-dimethylbutane, percent wt. | 2 | 6.5 | 4 | 5 |
| $C_6$ naphthenes, percent wt. | 8 | 8.5 | 9.5 | 10 |

EXAMPLE 13

6.5 g. of an aluminium hydrate, prepared by the hydrolysis of aluminum isopropoxide, was heated in dry nitrogen flowing at 100 ml./min. for 1 hour at 400° C. The alumina so produced had a BET surface area of 390 m.$^2$/g. and on analysis gave carbon 0.04% wt., hydrogen 0.87% wt. and chlorine 0.03% wt.

This alumina was then reacted with a stream of nitrogen saturated with carbon tetrachloride vapour, flowing at 100 ml./min. for 30 minutes at 300° C. The resulting chlorinated alumina had a BET surface area of 310 m.$^2$/g. and on analysis gave carbon 0.02% wt., hydrogen 0.20% wt. and chloride 10.30% wt.

The catalyst was tested for isomerization activity using a dry n-hexane feed (99.9 mole percent) under the following conditions.

Temperature—24° C.
Pressure—Atmospheric
Hydrogen/n-hexane mole ratio—6.2:1
Gas space velocity—170 v./v./hr.

Analysis of the product at 1 hour on stream showed the following composition.

|  | Percent wt. |
|---|---|
| Isobutane | 2.9 |
| Isopentane | 13.0 |
| n-Pentane | — |
| 2,2-dimethylbutane | 6.0 |
| 2,3-dimethylbutane<br>2,-methylpentane<br>3-dimethylpentane | 33.8 |
| n-Hexane | 44.3 |

The activity was, however, not maintained for as long a time as similar catalysts containing, in addition, a platinum group metal.

The following examples show the preparation of inactive catalysts and illustrate the specific nature of the present invention.

EXAMPLE 14

70 ml. (54.9 g.) of the platinum-alumina composite used in Example 10 was dried at 570° F. for 2 hours in a flow of 30 l./hr. of hydrogen. 4 ml. of carbon tetrachloride were then added to the hydrogen flow in 4¾ minutes, and the catalyst purged by continuing the hydrogen flow for 2 hours. During the carbon tetrachloride addition, appreciable quantities of hydrogen chloride were detected in the exit gases. The yield of catalyst was 56.3 g., and the chlorine content was 5.8% wt.

The catalyst was tested for isomerisation activity using a feedstock similar to that of Example 10 under the following conditions.

Temperature—270° F.
Pressure— 250 p.s.i.g.
Hydrogen:hydrocarbon mole ratio—2.5:1
Space velocity— 1.0 v./v./hr.

The yield of 2,2-dimethylbutane in the period 2–20 hours on stream was only 2.0% wt., which was the same as that of the feedstock, indicating that the catalyst was inactive for low temperature isomerisation.

Similar results were obtained when hydrogen chloride in nitrogen was used in place of carbon tetrachloride and hydrogen.

EXAMPLE 15

Example 14 was repeated except that, in place of a flow of carbon tetrachloride and hydrogen, chlorine gas was passed over the catalyst at 3.5 litres/hour for 3 hours. When tested under the isomerisation conditions of Example 14 the catalyst was again inactive.

EXAMPLE 16

5.0 g. portions of the platinum-alumina composite used in Example 1 were treated with nitrogen flowing at 100 ml./minute containing a number of chlorine containing hydrocarbons. The hydrocarbons used and the conditions of treatment were (a) Tetrachloroethane—20 minutes at 300° C.
(b) 1:2-dichloroethane—30 minutes at 350° C.
(c) Tetrachloroethylene—30 minutes at 300° C.
(d) Methyl chloride—30 minutes at 260° C.
(e) Methyl chloride—30 minutes at 370° C.

Pure methyl chloride gas flowing at 100 ml./min. and not a nitrogen:chlorinated hydrocarbon mixture was used in (d) and (e).

All these catalysts were inactive for the isomerisation of n-hexane at temperatures below 400° F., although analysis of the catalysts produced in (a) and (e) showed that they had an appreciably increased chlorine content, the catalyst produced in (a) having a chlorine content of 4.0% wt. and the catalyst produced in (e) a chlorine content of 5.2% wt.

It is to be understood that the process conditions used for the isomerisation in Examples 2, 3, 4, 5, 6, 7, 11, and 13 do not necessarily represent the optimum conditions. In certain cases conditions were deliberately chosen to provide a stringent test for catalyst activity rather than maximum isomerisation. Thus although the conversions under conditions involving low reaction temperature (20–24° C.), short contact time (gas space velocities of 125–250 v./v./hr.) and atmospheric pressures are small, they do in fact represent high catalytic activity since the conditions used were exceptionally discriminating.

We claim:

1. A method of preparing a catalyst suitable for the isomerization of $C_4$ and higher paraffin hydrocarbons in the gasoline boiling range at temperatures below 204° C., comprising contacting alumina free of a platinum group metal with a compound in the gaseous phase of the general formula

where X, when a monovalent radical, is selected from the group consisting of H, Cl, Br and SCl, where Y, when a monovalent radical, is selected from the group consisting of H, Cl, Br, F and SCl and where X and Y, when they together form a divalent radical, are selected from the class consisting of O and S, under non-reducing conditions at a temperature in the range of 149–593° C. such that chlorine is taken up by the alumina without the production of free aluminum chloride, the resulting catalyst containing from $2.0\times10^{-4}$ to $3.5\times10^{-4}$ g. of chlorine/sq. meter of surface area.

2. A method as claimed in claim 1 wherein the compound is carbon tetrachloride.

3. A method as claimed in claim 1 wherein the compound is chloroform.

4. A method as claimed in claim 1 wherein the compound is methylene chloride.

5. A method as claimed in claim 1 wherein the alumina is contacted by passing a gaseous stream of the chlorine compound over the alumina.

6. A method as claimed in claim 1 wherein the chlorine compound is carried in a stream of non-reducing carrier gas.

7. A method as claimed in claim 6 wherein the carrier gas is selected from the class consisting of nitrogen, air and oxygen.

8. A method as claimed in claim 1 wherein a platinum group metal-alumina composite is contacted and the temperature of contacting is from 149 to 371° C.

9. A method as claimed in claim 1 wherein the rate of addition of the chlorine compound does not exceed 1.3% wt. of chlorine compound by weight of catalyst per minute.

10. Catalysts when prepared by a method as claimed in claim 1.

11. A process for the isomerization of $C_4$ and higher paraffin hydrocarbons boiling in the gasoline boiling range comprising contacting the paraffin hydrocarbons in a reaction zone in the presence of hydrogen in a hydrogen: hydrocarbon mole ratio of from 0.1:1 to 20:1, at a pressure from atmospheric to 2000 p.s.i.g., at a temperature in the range 10–204° C. with a catalyst prepared by contacting alumina free of a platinum group metal with a compound having the general formula

where X is selected from the class consisting of H, Cl, Br and SCl, and Y is selected from the class consisting of H, Cl, Br, F and SCl, in the absence of free hydrogen and at a temperature in the range of 149–593° C. such that chlorine is taken up by the alumina without the production of free aluminum chloride, said catalyst containing from $2.0\times10^{-4}$ to $3.5\times10^{-4}$ g. of chlorine/sq. meter of surface area.

12. A process for the isomerization of $C_4$ and higher paraffin hydrocarbons boiling in the gasoline boiling range comprising contacting the paraffin hydrocarbons in a reaction zone in the presence of hydrogen in a hydrogen: hydrocarbon mole ratio from 0.01:1 to 20:1, at a pressure of atmospheric to 2000 p.s.i.g., at a temperature in the range 10–204° C. with a catalyst prepared by contacting alumina with a compound of general formula

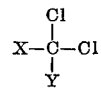

where X and Y together form a divalent radical selected from the class consisting of O and S in the absence of free hydrogen and at a temperature in the range of 149–593° C. such that chlorine is taken up by the alumina without the production of free aluminum chloride, said catalyst containing from $2.0\times10^{-4}$ to $3.5\times10^{-4}$ g. of chlorine/sq. meter of surface area.

13. A process for the isomerization of $C_4$ and higher paraffin hydrocarbons according to claim 11 wherein the compound is selected from the group consisting of carbontetrachloride, chloroform and methylene chloride.

14. A process for the isomerization of paraffin hydrocarbons according to claim 11 wherein the feedstock contains a major proportion of paraffin hydrocarbons selected from the group consisting of pentanes, hexanes and mixtures of pentanes and hexanes.

References Cited

UNITED STATES PATENTS

| | | | |
|---|---|---|---|
| 2,880,168 | 3/1959 | Felder | 252—411 |
| 2,939,897 | 6/1960 | Bebber et al. | 260—683.68 |
| 2,642,384 | 6/1953 | Cox | 208—139 |
| 2,798,105 | 7/1957 | Heinemann et al. | 260—683.65 |
| 2,944,097 | 7/1960 | Starnes et al. | 260—683.68 |
| 2,944,098 | 7/1960 | Fogle et al. | 260—683.68 |

CURTIS R. DAVIS, Primary Examiner

U.S. Cl. X.R.

252—441, 442, 466, 472; 260—683.75

UNITED STATES PATENT OFFICE
CERTIFICATE OF CORRECTION

Patent No. 3,553,281           Dated January 5, 1971

Inventor(s) Anthony George Goble et al.

It is certified that error appears in the above-identified patent and that said Letters Patent are hereby corrected as shown below:

Column 2, line 24, "chloro form" should read -- chloroform --; line 42, "ad-" should read -- ab- --. Column 3, line 45, "idefinitely" should read -- indefinitely --; line 64, "minimum should read -- minium --; line 72, ")" should read -- ( --. Column 6, Table 2, the second line under column 7, "20." should read -- 2.7 --; same Table 2, the third line under column 7, ".67" should read -- 0.6 --. Column 9, line 22, "450°S." should read -- 450° C. --. Column 11, Table 11, the heading "FEED 3.6  12.5  24.27" should read -- FEED 3-6  12-15  24-27 --.

Signed and sealed this 30th day of November 1971.

(SEAL)
Attest:

EDWARD M. FLETCHER, JR.           ROBERT GOTTSCHALK
Attesting Officer                    Acting Commissioner of Patents